United States Patent
Schuch et al.

(10) Patent No.: US 9,924,583 B2
(45) Date of Patent: Mar. 20, 2018

(54) DISPLAY BRIGHTNESS CONTROL BASED ON LOCATION DATA

(71) Applicant: Manufacturing Resources International, Inc., Alpharetta, GA (US)

(72) Inventors: John Schuch, Buford, GA (US); William Dunn, Alpharetta, GA (US); Rick De Laet, Alpharetta, GA (US); Dan Safstrom, Alpharetta, GA (US)

(73) Assignee: Mnaufacturing Resources International, Inc., Alpharetta, GA (US)

( * ) Notice: Subject to any disclaimer, the term of this patent is extended or adjusted under 35 U.S.C. 154(b) by 0 days.

(21) Appl. No.: 15/043,100

(22) Filed: Feb. 12, 2016

(65) Prior Publication Data
US 2016/0338181 A1   Nov. 17, 2016

Related U.S. Application Data

(60) Provisional application No. 62/161,673, filed on May 14, 2015.

(51) Int. Cl.
*G09G 3/34* (2006.01)
*H05B 37/02* (2006.01)
*G02F 1/1335* (2006.01)

(52) U.S. Cl.
CPC ....... *H05B 37/0281* (2013.01); *G02F 1/1336* (2013.01); *G09G 3/3406* (2013.01); *Y02B 20/42* (2013.01); *Y02B 20/46* (2013.01)

(58) Field of Classification Search
CPC ............ H05B 37/0218; H05B 37/0281; G02F 1/1336; G02F 1/133602; G02F 1/133603
(Continued)

(56) References Cited

U.S. PATENT DOCUMENTS 4,093,355 A   6/1978   Kaplit et al.
4,593,978 A   6/1986   Mourey et al.
(Continued)

FOREIGN PATENT DOCUMENTS

CA   2754371 C   11/2017
EP   0313331 B1   2/1994
(Continued)

OTHER PUBLICATIONS

Zeef, Hubing, EMC analysis of 18' LCD Monitor, Aug. 2000, 1 page.
(Continued)

*Primary Examiner* — Jason M Crawford
(74) *Attorney, Agent, or Firm* — Standley Law Group LLP (57) ABSTRACT

The exemplary embodiments herein provide an electronic display assembly having a liquid crystal display, a backlight placed behind the liquid crystal display, one or more power modules in electrical connection with the backlight, and a microprocessor in electrical connection with the power module(s). Said microprocessor is adapted to determine the sunset and sunrise times for each day and determine whether the present time is between sunrise and sunset or between sunset and sunrise. The microprocessor is further adapted to direct the power module(s) to drive the backlight at a daytime level if the present time is between sunrise and sunset, and direct the power module(s) to drive the backlight at a nighttime level if the present time is between sunset and sunrise.

31 Claims, 9 Drawing Sheets

(58) Field of Classification Search
USPC .................................. 315/149–151; 345/99
See application file for complete search history.

(56) References Cited

U.S. PATENT DOCUMENTS

| | | |
|---|---|---|
| 4,634,225 A | 1/1987 | Haim et al. |
| 5,029,982 A | 7/1991 | Nash |
| 5,088,806 A | 2/1992 | McCartney et al. |
| 5,162,785 A | 11/1992 | Fagard |
| 5,247,374 A | 9/1993 | Tereda |
| 5,559,614 A | 9/1996 | Urbish et al. |
| 5,661,374 A | 8/1997 | Cassidy et al. |
| 5,748,269 A | 5/1998 | Harris et al. |
| 5,767,489 A | 6/1998 | Ferrier |
| 5,783,909 A | 7/1998 | Hochstein |
| 5,786,801 A | 7/1998 | Ichise |
| 5,808,418 A | 9/1998 | Pitman |
| 5,818,010 A | 10/1998 | McCann |
| 5,952,992 A | 9/1999 | Helms |
| 5,991,153 A | 11/1999 | Heady et al. |
| 6,089,751 A | 7/2000 | Conover et al. |
| 6,144,359 A | 11/2000 | Grave |
| 6,153,985 A | 11/2000 | Grossman |
| 6,157,143 A | 12/2000 | Bigio |
| 6,157,432 A | 12/2000 | Helbing |
| 6,181,070 B1 | 1/2001 | Dunn et al. |
| 6,191,839 B1 | 2/2001 | Briley |
| 6,259,492 B1 | 7/2001 | Imoto |
| 6,292,228 B1 | 9/2001 | Cho |
| 6,297,859 B1 | 10/2001 | George |
| 6,380,853 B1 | 4/2002 | Long et al. |
| 6,388,388 B1 * | 5/2002 | Weindorf ............. G09G 3/3406 315/157 |
| 6,400,101 B1 | 6/2002 | Biebl et al. |
| 6,417,900 B1 | 7/2002 | Shin et al. |
| 6,509,911 B1 | 1/2003 | Shimotono |
| 6,535,266 B1 | 3/2003 | Nemeth et al. |
| 6,628,355 B1 | 9/2003 | Takahara |
| 6,712,046 B2 | 3/2004 | Nakamichi |
| 6,753,661 B2 | 6/2004 | Muthu et al. |
| 6,753,842 B1 * | 6/2004 | Williams ............. G09G 3/3406 340/539.13 |
| 6,762,741 B2 | 7/2004 | Weindorf |
| 6,798,341 B1 | 9/2004 | Eckel et al. |
| 6,809,718 B2 | 10/2004 | Wei et al. |
| 6,812,851 B1 | 11/2004 | Dukach et al. |
| 6,813,375 B2 | 11/2004 | Armato, III et al. |
| 6,839,104 B2 | 1/2005 | Taniguchi et al. |
| 6,850,209 B2 | 2/2005 | Mankins et al. |
| 6,885,412 B2 | 4/2005 | Ohinishi et al. |
| 6,886,942 B2 | 5/2005 | Okada et al. |
| 6,891,135 B2 | 5/2005 | Pala et al. |
| 6,943,768 B2 | 9/2005 | Cavanaugh et al. |
| 6,982,686 B2 | 1/2006 | Miyachi et al. |
| 6,996,460 B1 | 2/2006 | Krahnstoever et al. |
| 7,015,470 B2 | 3/2006 | Faytlin et al. |
| 7,038,186 B2 | 5/2006 | De Brabander et al. |
| 7,064,733 B2 | 6/2006 | Cok et al. |
| 7,083,285 B2 | 8/2006 | Hsu et al. |
| 7,174,029 B2 | 2/2007 | Agostinelli et al. |
| 7,176,640 B2 | 2/2007 | Tagawa |
| 7,307,614 B2 | 12/2007 | Vinn |
| 7,324,080 B1 | 1/2008 | Hu et al. |
| 7,330,002 B2 | 2/2008 | Joung |
| 7,354,159 B2 | 4/2008 | Nakamura et al. |
| 7,474,294 B2 | 1/2009 | Lee |
| 7,480,042 B1 | 1/2009 | Phillips et al. |
| 7,518,600 B2 | 4/2009 | Lee |
| 7,595,785 B2 | 9/2009 | Jang |
| 7,639,220 B2 | 12/2009 | Yoshida et al. |
| 7,659,676 B2 | 2/2010 | Hwang |
| 7,692,621 B2 | 4/2010 | Song |
| 7,724,247 B2 | 5/2010 | Yamazaki et al. |
| 7,795,574 B2 | 9/2010 | Kennedy et al. |
| 7,795,821 B2 | 9/2010 | Jun |
| 7,800,706 B2 | 9/2010 | Kim et al. |
| 7,804,477 B2 | 9/2010 | Sawada et al. |
| 7,982,706 B2 | 7/2011 | Ichikawa et al. |
| 8,087,787 B2 | 1/2012 | Medin |
| 8,111,371 B2 | 2/2012 | Suminoe et al. |
| 8,125,163 B2 | 2/2012 | Dunn et al. |
| 8,144,110 B2 | 3/2012 | Huang |
| 8,175,841 B2 | 5/2012 | Ooghe |
| 8,194,031 B2 | 6/2012 | Yao et al. |
| 8,248,203 B2 | 8/2012 | Hanwright et al. |
| 8,352,758 B2 | 1/2013 | Atkins et al. |
| 8,508,155 B2 | 8/2013 | Schuch |
| 8,569,910 B2 | 10/2013 | Dunn et al. |
| 8,605,121 B2 | 12/2013 | Chu et al. |
| 8,700,226 B2 | 4/2014 | Schuch et al. |
| 8,797,372 B2 | 8/2014 | Liu |
| 8,810,501 B2 | 8/2014 | Budzelaar et al. |
| 8,823,630 B2 | 9/2014 | Roberts et al. |
| 8,829,815 B2 | 9/2014 | Dunn et al. |
| 8,895,836 B2 | 11/2014 | Amin et al. |
| 8,901,825 B2 * | 12/2014 | Reed ................. H05B 37/0218 315/149 |
| 8,982,013 B2 | 3/2015 | Sako et al. |
| 8,983,385 B2 | 3/2015 | Macholz |
| 8,988,011 B2 | 3/2015 | Dunn |
| 9,030,129 B2 | 5/2015 | Dunn et al. |
| 9,167,655 B2 | 10/2015 | Dunn et al. |
| 9,286,020 B2 | 3/2016 | Dunn et al. |
| 9,448,569 B2 | 9/2016 | Schuch et al. |
| 9,451,060 B1 | 9/2016 | Bowers et al. |
| 9,516,485 B1 | 12/2016 | Bowers et al. |
| 9,622,392 B1 | 4/2017 | Bowers et al. |
| 9,799,306 B2 * | 10/2017 | Dunn ..................... G09G 5/10 |
| 2002/0050974 A1 | 5/2002 | Rai et al. |
| 2002/0101553 A1 | 8/2002 | Enomoto et al. |
| 2002/0112026 A1 | 8/2002 | Fridman et al. |
| 2002/0126248 A1 | 9/2002 | Yoshida |
| 2002/0154138 A1 | 10/2002 | Wada et al. |
| 2002/0164962 A1 | 11/2002 | Mankins et al. |
| 2002/0167637 A1 | 11/2002 | Burke et al. |
| 2002/0190972 A1 | 12/2002 | Ven De Van |
| 2003/0007109 A1 | 1/2003 | Park |
| 2003/0088832 A1 | 5/2003 | Agostinelli et al. |
| 2003/0204342 A1 | 10/2003 | Law et al. |
| 2003/0214242 A1 | 11/2003 | Berg-johansen |
| 2003/0230991 A1 | 12/2003 | Muthu |
| 2004/0032382 A1 | 2/2004 | Cok et al. |
| 2004/0036697 A1 | 2/2004 | Kim et al. |
| 2004/0036834 A1 | 2/2004 | Ohnishi et al. |
| 2004/0113044 A1 | 6/2004 | Ishiguchi |
| 2004/0165139 A1 | 8/2004 | Anderson et al. |
| 2004/0243940 A1 | 12/2004 | Lee et al. |
| 2005/0012734 A1 | 1/2005 | Johnson et al. |
| 2005/0043907 A1 | 2/2005 | Eckel et al. |
| 2005/0049729 A1 | 3/2005 | Culbert et al. |
| 2005/0073518 A1 | 4/2005 | Bontempi |
| 2005/0094391 A1 | 5/2005 | Campbell et al. |
| 2005/0127796 A1 | 6/2005 | Olesen et al. |
| 2005/0140640 A1 | 6/2005 | Oh et al. |
| 2005/0184983 A1 | 8/2005 | Brabander et al. |
| 2005/0231457 A1 | 10/2005 | Yamamoto et al. |
| 2005/0242741 A1 | 11/2005 | Shiota et al. |
| 2006/0007107 A1 | 1/2006 | Ferguson |
| 2006/0022616 A1 | 2/2006 | Furukawa |
| 2006/0038511 A1 | 2/2006 | Tagawa |
| 2006/0049533 A1 | 3/2006 | Kamoshita |
| 2006/0087521 A1 | 4/2006 | Chu et al. |
| 2006/0125773 A1 | 6/2006 | Ichikawa et al. |
| 2006/0130501 A1 | 6/2006 | Singh et al. |
| 2006/0197474 A1 | 9/2006 | Olsen |
| 2006/0197735 A1 * | 9/2006 | Vuong ................. G09G 3/3406 345/102 |
| 2006/0214904 A1 | 9/2006 | Kimura et al. |
| 2006/0215044 A1 | 9/2006 | Masuda et al. |
| 2006/0220571 A1 | 10/2006 | Howell et al. |
| 2006/0238531 A1 | 10/2006 | Wang |
| 2006/0244702 A1 | 11/2006 | Chu et al. |
| 2007/0013828 A1 | 1/2007 | Cho et al. |
| 2007/0047808 A1 | 3/2007 | Choe et al. |

(56) References Cited

U.S. PATENT DOCUMENTS

| | | |
|---|---|---|
| 2007/0152949 A1 | 7/2007 | Sakai |
| 2007/0171647 A1 | 7/2007 | Artwohl et al. |
| 2007/0173297 A1 | 7/2007 | Cho et al. |
| 2007/0200513 A1 | 8/2007 | Ha et al. |
| 2007/0230167 A1 | 10/2007 | McMahon et al. |
| 2007/0242153 A1 | 10/2007 | Tang et al. |
| 2007/0247594 A1 | 10/2007 | Tanaka |
| 2007/0268234 A1 | 11/2007 | Wakabayashi et al. |
| 2007/0268241 A1 | 11/2007 | Nitta et al. |
| 2007/0273624 A1* | 11/2007 | Geelen .................. G01C 21/36 345/84 |
| 2007/0279369 A1 | 12/2007 | Yao et al. |
| 2007/0291198 A1 | 12/2007 | Shen |
| 2007/0297163 A1 | 12/2007 | Kim et al. |
| 2007/0297172 A1 | 12/2007 | Furukawa et al. |
| 2008/0055297 A1 | 3/2008 | Park |
| 2008/0074382 A1 | 3/2008 | Lee et al. |
| 2008/0078921 A1 | 4/2008 | Yang et al. |
| 2008/0084166 A1 | 4/2008 | Tsai |
| 2008/0111958 A1 | 5/2008 | Kleverman et al. |
| 2008/0136770 A1 | 6/2008 | Peker et al. |
| 2008/0143187 A1 | 6/2008 | Hoekstra et al. |
| 2008/0151082 A1 | 6/2008 | Chan |
| 2008/0176345 A1 | 7/2008 | Yu et al. |
| 2008/0185976 A1 | 8/2008 | Dickey et al. |
| 2008/0218501 A1 | 9/2008 | Diamond |
| 2008/0246871 A1 | 10/2008 | Kupper et al. |
| 2008/0266554 A1 | 10/2008 | Sekine et al. |
| 2008/0278099 A1 | 11/2008 | Bergfors et al. |
| 2008/0278100 A1 | 11/2008 | Hwang |
| 2008/0303918 A1 | 12/2008 | Keithley |
| 2009/0009997 A1 | 1/2009 | Sanfilippo et al. |
| 2009/0033612 A1 | 2/2009 | Roberts et al. |
| 2009/0079416 A1 | 3/2009 | Vinden et al. |
| 2009/0085859 A1 | 4/2009 | Song |
| 2009/0091634 A1 | 4/2009 | Kennedy et al. |
| 2009/0104989 A1 | 4/2009 | Williams et al. |
| 2009/0135167 A1 | 5/2009 | Sakai et al. |
| 2009/0152445 A1 | 6/2009 | Gardner, Jr. |
| 2009/0278766 A1 | 11/2009 | Sake et al. |
| 2009/0284457 A1 | 11/2009 | Botzas et al. |
| 2009/0289968 A1 | 11/2009 | Yoshida |
| 2010/0039366 A1* | 2/2010 | Hardy ............... G02F 1/133602 345/102 |
| 2010/0039440 A1 | 2/2010 | Tanaka et al. |
| 2010/0060861 A1 | 3/2010 | Medin |
| 2010/0177750 A1 | 7/2010 | Essinger et al. |
| 2010/0253660 A1 | 10/2010 | Hashimoto |
| 2011/0032285 A1 | 2/2011 | Yao et al. |
| 2011/0050738 A1 | 3/2011 | Fujioka et al. |
| 2011/0058326 A1 | 3/2011 | Idems et al. |
| 2011/0074737 A1 | 3/2011 | Hsieh et al. |
| 2011/0074803 A1 | 3/2011 | Kerofsky |
| 2011/0102630 A1 | 5/2011 | Rukes |
| 2011/0163691 A1 | 7/2011 | Dunn |
| 2011/0175872 A1 | 7/2011 | Chuang et al. |
| 2011/0193872 A1 | 8/2011 | Biernath et al. |
| 2011/0231676 A1 | 9/2011 | Atkins et al. |
| 2011/0260534 A1 | 10/2011 | Rozman et al. |
| 2011/0279426 A1 | 11/2011 | Imamura et al. |
| 2012/0075362 A1 | 3/2012 | Ichioka et al. |
| 2012/0081279 A1 | 4/2012 | Greenebaum et al. |
| 2012/0176420 A1 | 7/2012 | Liu |
| 2012/0182278 A1 | 7/2012 | Ballestad |
| 2012/0284547 A1 | 11/2012 | Culbert et al. |
| 2013/0027370 A1* | 1/2013 | Dunn .................. G06F 3/14 345/207 |
| 2013/0098425 A1 | 4/2013 | Amin et al. |
| 2013/0158730 A1 | 6/2013 | Yasuda et al. |
| 2013/0278868 A1 | 10/2013 | Dunn et al. |
| 2014/0002747 A1 | 1/2014 | Macholz |
| 2014/0132796 A1 | 5/2014 | Prentice et al. |
| 2014/0139116 A1 | 5/2014 | Reed |
| 2014/0204452 A1 | 7/2014 | Branson |
| 2014/0232709 A1 | 8/2014 | Dunn et al. |
| 2014/0365965 A1* | 12/2014 | Bray .................... G06T 11/001 715/810 |
| 2015/0062892 A1* | 3/2015 | Krames .............. H05B 37/0281 362/231 |
| 2015/0070337 A1* | 3/2015 | Bell .................... G09G 3/2003 345/207 |
| 2015/0346525 A1* | 12/2015 | Wolf .................... G02F 1/1336 345/589 |
| 2016/0037606 A1 | 2/2016 | Dunn et al. |
| 2016/0198545 A1 | 7/2016 | Dunn et al. |
| 2016/0338181 A1 | 11/2016 | Schuch et al. |
| 2016/0338182 A1 | 11/2016 | Schuch et al. |
| 2016/0358530 A1 | 12/2016 | Schuch et al. |
| 2016/0358538 A1 | 12/2016 | Schuch et al. |
| 2017/0111486 A1 | 4/2017 | Bowers et al. |
| 2017/0111520 A1 | 4/2017 | Bowers et al. |

FOREIGN PATENT DOCUMENTS

| | | |
|---|---|---|
| EP | 2299723 A1 | 3/2011 |
| EP | 2401738 A2 | 1/2012 |
| EP | 2577389 A2 | 4/2013 |
| EP | 2769376 A1 | 8/2014 |
| GB | 2369730 A | 5/2002 |
| JP | 03153212 A | 7/1991 |
| JP | 8193727 A | 7/1996 |
| JP | 11160727 A | 6/1999 |
| JP | 2000122575 A | 4/2000 |
| JP | 2004325629 A | 11/2004 |
| JP | 2005265922 A | 9/2005 |
| JP | 2006145890 A | 6/2006 |
| JP | 2006318733 A | 11/2006 |
| JP | 2007003638 A | 1/2007 |
| JP | 2007322718 A | 12/2007 |
| JP | 200803481 A | 2/2008 |
| JP | 2008122695 A | 5/2008 |
| JP | 2009031622 A | 2/2009 |
| KR | 10-2006-0016469 A | 2/2006 |
| KR | 1020080000144 A | 1/2008 |
| KR | 1020080013592 A | 2/2008 |
| KR | 1020080086245 A | 9/2008 |
| KR | 10-2011-0125249 A | 11/2011 |
| KR | 10-1759265 B1 | 7/2017 |
| WO | 2008/050402 A1 | 5/2008 |
| WO | 2010/141739 A2 | 12/2010 |
| WO | 2011/052331 A1 | 5/2011 |
| WO | 2011/130461 A2 | 10/2011 |
| WO | 2011/150078 A2 | 12/2011 |
| WO | 2013/044245 A1 | 3/2013 |
| WO | 2016/183576 A4 | 11/2016 |
| WO | 2017/031237 A1 | 2/2017 |

OTHER PUBLICATIONS

Kunkely, H. et al., Photochemistry and Beer, Journal of Chemical Education, Jan. 1982, pp. 25-27, vol. 59, No. 1.

Novitsky, T. et al., Design How-To, Driving LEDs versus CCFLs for LCD backlighting, EE Times, Nov. 12, 2007, 6 pages, AspenCore.

* cited by examiner

DISPLAY BRIGHTNESS CONTROL BASED ON LOCATION DATA

CROSS-REFERENCE TO RELATED APPLICATIONS

This application claims priority to U.S. Application No. 62/161,673 filed on May 14, 2015 and is herein incorporated by reference in its entirety.

TECHNICAL FIELD

Exemplary embodiments relate generally to a system and method for controlling the brightness of a display based on several types of data.

BACKGROUND

Electronic displays have become useful for not only indoor entertainment purposes, but are now being utilized for indoor and outdoor advertising/informational purposes. For example, liquid crystal displays (LCDs), plasma displays, OLEDS, and many other flat panel displays are now being used to display information and advertising materials to consumers in locations outside of their own home or within airports, arenas, stadiums, restaurants/bars, gas station pumps, billboards, and even moving displays on the tops of automobiles or on the sides of trucks.

The rapid development of flat panel displays has allowed users to mount these displays in a variety of locations that were not previously available. Further, the popularity of high definition (HD) television has increased the demand for larger and brighter displays, especially large displays which are capable of producing HD video. The highly competitive field of consumer advertising has also increased the demand for large displays which are positioned outdoors, sometimes within direct sunlight or other high ambient light situations (street lights, building signs, vehicle headlights, and other displays). In order to be effective, outdoor displays must compete with the ambient natural light to provide a clear and bright image to the viewer.

SUMMARY OF THE EXEMPLARY EMBODIMENTS

The exemplary embodiments herein provide a system and method for controlling the luminance of a display based on a combination of metrics. In some embodiments, the luminance is controlled based on the time of day, which is compared with sunrise/sunset data. In other embodiments, the system is controlled based on the time of day (when operating at nighttime) but controlled based on ambient light levels in the daytime. Other embodiments primarily operate based on the ambient light levels but switch to operation based on the time of day when a failure is detected in the ambient light sensor.

Some embodiments operate without the use of data from the ambient light sensor. In these embodiments, sunset and sunrise transition periods are calculated by the system and used to gradually ramp the display brightness up/down during these transition periods. Further embodiments also access local weather information and adjust the display brightness based on the percentage of cloud cover.

The exemplary embodiments herein disclosed are not intended to be exhaustive or to unnecessarily limit the scope of the embodiments. The exemplary embodiments were chosen and described in order to explain the principles so that others skilled in the art may practice the embodiments. Having shown and described exemplary embodiments, those skilled in the art will realize that many variations and modifications may be made to affect the described invention. Many of those variations and modifications will provide the same result and fall within the spirit of the exemplary embodiments. It is the intention, therefore, to limit the embodiments only as indicated by the scope of the claims.

BRIEF DESCRIPTION OF THE DRAWINGS

A better understanding will be obtained from a reading of the following detailed description and the accompanying drawings wherein identical reference characters refer to identical parts and in which.

DETAILED DESCRIPTION OF PREFERRED EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
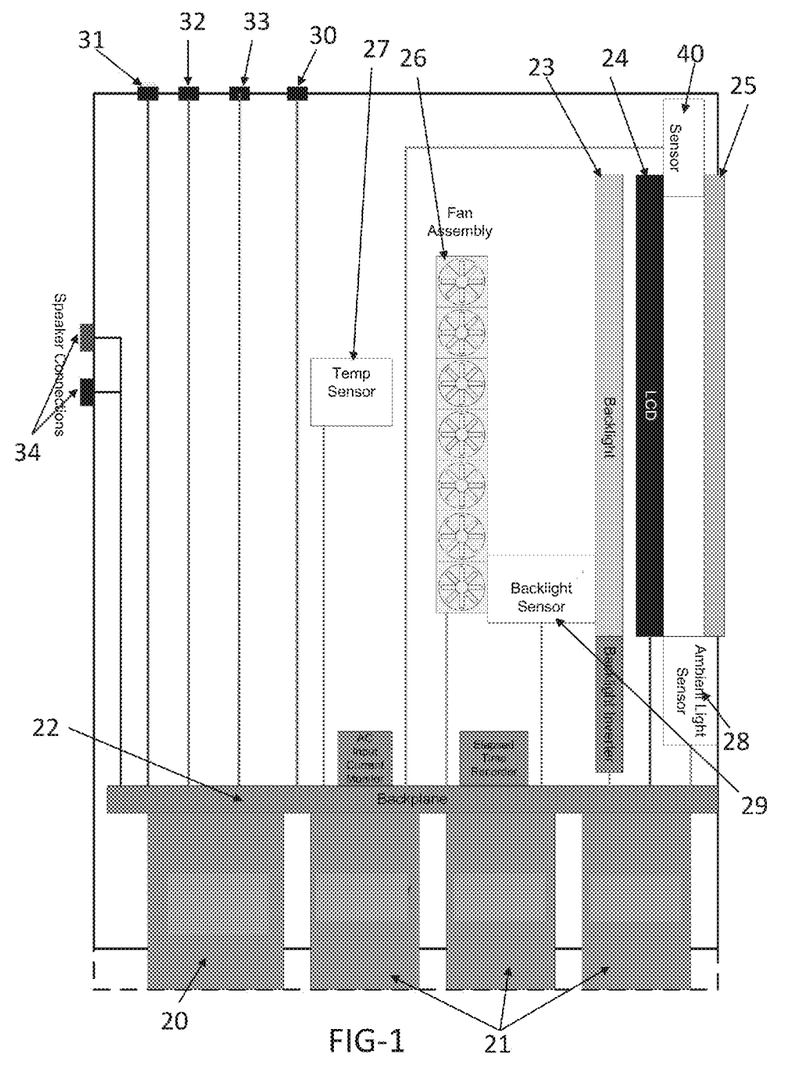
FIG. 1 provides a block diagram for various electronic components which may be used within an exemplary electronic display assembly.

FIG. 1 provides a block diagram for various electronic components which may be used within an exemplary electronic display assembly. One or more power modules 21 may be placed in electrical connection with a backplane 29, which could be provided as a printed circuit board which may facilitate electrical communication and/or power between a number of components in the display assembly. A display controlling assembly 20 may also be in electrical connection with the backplane 22. The display controlling assembly 20 preferably includes a number of different components, including but not limited to a video player, electronic storage, and a microprocessor which is programmed to perform any of the logic that is described within this application.

This figure also shows a backlight 23, LCD assembly 24, and a front transparent display panel 25. The backlight 23 may be a CCFL or light emitting diode (LED) backlight. It should be noted that although the setup for an LCD is shown, embodiments can be practiced with any electronic image-producing assembly. Thus any other flat panel display could be used such as plasma, light-emitting polymers, and organic light emitting diode (OLED) displays. When the display type does not include a traditional backlight, then the term "drive backlight" as used herein, can be replaced with "drive display" and the term "backlight level" as used herein, can be replaced with "display level." A fan assembly 26 is shown for optionally cooling displays which may reach elevated temperatures. One or more temperature sensors 27 may be used to monitor the temperature of the display assembly, and selectively engage fan assembly 26 when cooling is needed. An ambient light sensor 28 may be positioned to measure the amount of ambient light that is contacting the front display panel 25, although this is not required. As described below, some embodiments may use the ambient light sensor 28 in a limited capacity, but a preferred embodiment would operate without the need for the ambient light sensor 28 at all.

A variety of different electrical inputs/outputs are also shown, and all or only a select few of the inputs/outputs may be practiced with any given embodiment. The AC power input 30 delivers the incoming power to the backplane 22. A video signal input 31 can receive video signals from a plurality of different sources. In a preferred embodiment the video signal input 31 would be an HDMI input. Two data interface connections 32 and 33 are also shown. The first data interface connection 32 may be an RS2332 port or an IEEE 802.3 jack which can facilitate user setup and system monitoring. Either form of the connection should allow electrical communication with a personal computer. The second data interface connection 33 may be a network connection such as an Ethernet port, wireless network connection, or a satellite network connection. The second data interface connection 33 preferably allows the display assembly to communicate with the internet, and may also permit a remote user to communicate with the display assembly. The second data interface connection 33 can also provide the video data through a network source. The second data interface connection 33 can also be utilized to transmit display settings, error messages, and various other forms of data to a website for access and control by the user. Optional audio connections 34 may also be provided for connection to internal or external speaker assemblies. It is not required that the data inputs 31, 32, and 33 received their data through a wired connection, as many embodiments may utilize wireless networks or satellite networks to transmit data to the display assembly. The various types of wireless/satellite receivers and transmitters have not been specifically shown due to the large number of variable types and arrangements, but these are understood by a person of ordinary skill in the art.

A backlight sensor 29 is preferably placed within the backlight cavity to measure the amount of luminance being generated within the backlight cavity. Additionally, a display luminance sensor 40 is preferably positioned in front of the display 24 in order to measure the amount of luminance exiting the display 24. Either sensor can be used in a traditional feed-back loop to evaluate the control signals being sent to the power modules 21 and what resulting backlight luminance or display luminance is generated by the display in response. As shown below, ambient light data (either actual measurements or artificial ambient light sensor data, herein "AAS") may be used to select either the desired display luminance or backlight luminance. Either technique can be used with the various embodiments herein.

Information for monitoring the status of the various display components may be transmitted through either of the two data interface connections 32 and 33, so that the user can be notified when a component may be functioning improperly, about to fail, or has already failed and requires replacement. The information for monitoring the status of the display may include, but is not limited to: power supply status, power supply test results, AC input current, temperature sensors, fan speed, video input status, firmware revision, and light level sensors. Also, the user may adjust settings including, but not limited to: on/off, brightness level, enabling ambient light sensor, various alert settings, IP address, customer defined text/video, display matrix settings, display of image settings via OSD, and various software functions. In some embodiments, these settings can be monitored and altered from either of the two data interface connections 32 and 33.

Figure 2:
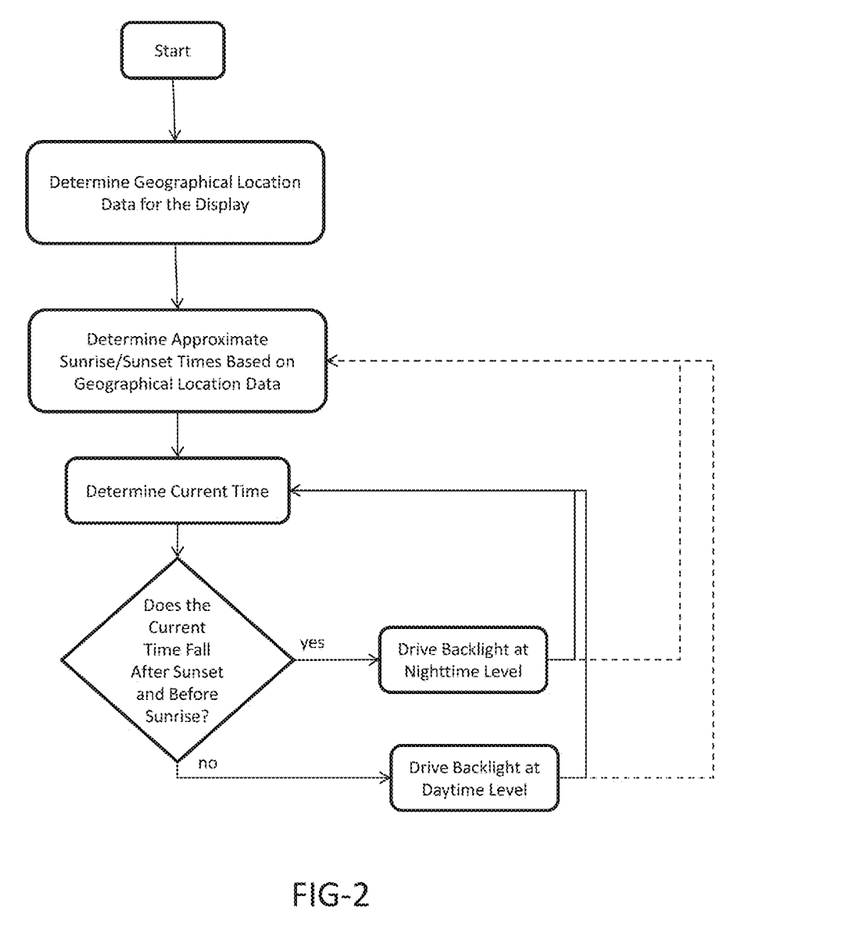
FIG. 2 provides a logical flow chart for performing a first embodiment of the method which is controlled only based on the display location data.

FIG. 2 provides a logical flow chart for performing a first embodiment of the method which is controlled only based on the display location data. As an initial step in this embodiment, the system preferably determines the geographical location data for the display. This can be performed in a number of ways. First, the physical address of the display may be used to determine the city/state in which the display is located. Second, the physical address of the display can be exchanged for the latitude and longitude coordinates. This technique can be performed by accessing a number of online tools, including but not limited to www.latlong.net. Third, the location of the display can be determined by reading coordinates from a GPS capable smart device which may form a part of the display controlling assembly 20. If the coordinates result in a physical address then this can be converted to the latitude and longitude coordinates, or vice versa by the techniques noted above.

Once the location of the display is determined, the sunset and sunrise times for this location are preferably determined. The timing for performing this step can vary. In some embodiments, this step could be performed only once, with 365 days of data being used for the display throughout the remainder of the display's lifetime. Alternatively, this step could be performed annually, monthly, weekly, or even daily. This step can also be performed in a number of ways. First, when given a physical address, the system can determine the sunrise/sunset times based on this address and store them within the electronic storage on the display controlling assembly 20. Second, when given latitude/longitude coordinates, the system can determine the sunrise/sunset times based on these coordinates and store them within the electronic storage on the display controlling assembly 20. The location data can be converted to sunrise/sunset times by accessing any number of online databases, including but not limited to: www.sunrisesunset.com, www.suncalc.net, and various NOAA online tools. Additionally, the latitude and longitude data can be used to calculate sunrise/sunset times based on the sunrise equation:

$$\cos \omega_o = -\tan \varphi \times \tan \delta \text{ where:}$$

$\omega_o$ is the hour angle at either sunrise (when negative value is taken) or sunset (when positive value is taken);

$\varphi$ is the latitude of the observer on the Earth; and $\delta$ is the sun declination.

It should be noted that the steps of determining geographical location data for the display and determining approximate sunrise/sunset times based on the geographical location data, may be performed before the display is shipped to its actual location. In other embodiments, the display may be installed within its actual location prior to performing these steps.

Once the approximate sunrise/sunset times are determined (and preferably stored at the display), the system would then check to see what the current time is and determine whether it is currently night or day. While the figure reads the logic as "does the current time fall after sunset and before sunrise," it seems clear that this could also be performed by determining "does the current time fall after sunrise and before sunset" and it makes no difference in any of the subject embodiments. In this first embodiment, if the system determines that it is currently nighttime, the backlight is driven at the nighttime level. Alternatively, if the system determines that it is daytime, the backlight is driven at the daytime level.

The relative daytime level and nighttime level for the backlight can be selected for this embodiment through a simple binary operation where a first luminance value for the backlight is desired during nighttime and a second luminance value for the backlight is desired during daytime. The system may push as much power as necessary to the backlight 23 in order to read the desired luminance value from the backlight sensor 29. The power levels can be adjusted through the feedback coming from the backlight sensor 29 to ensure that the desired luminance level of the backlight 23 is maintained. Alternatively, the desired luminance can be measured based on the level of luminance for the light which is exiting the display 24, measured by the light sensor 40. The sensor 40 can also provide the feedback to the system to ensure that the proper amount of power is being sent to the backlight 23 to ensure adequate luminance levels exiting the display.

The dashed lines on the figure indicate the option of the system returning to determine the approximate sunrise/sunset times, if practicing an embodiment where this data is updated annually, monthly, weekly, or daily.

Figure 3:
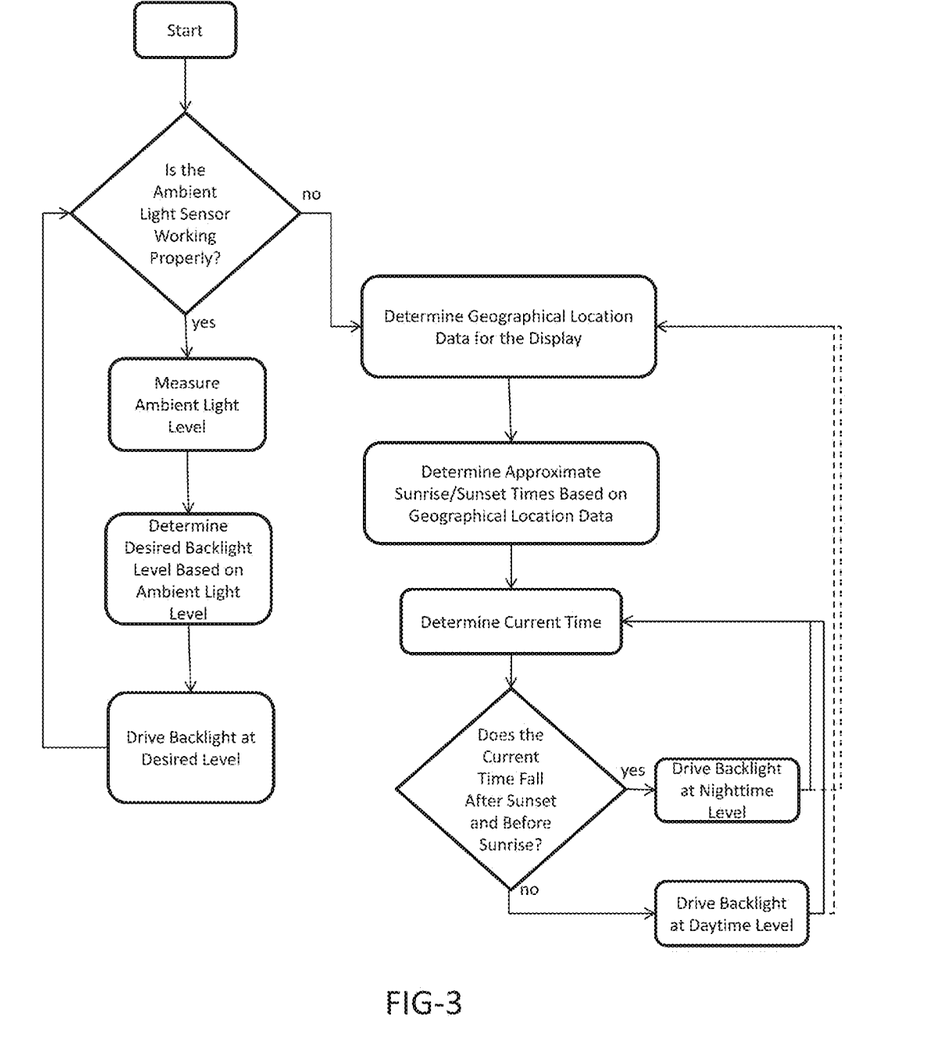
FIG. 3 provides a logical flow chart for performing a second embodiment of the method which is controlled initially by data from the ambient light sensor but switches to display location data if a failure is observed in the ambient light sensor.

FIG. 3 provides a logical flow chart for performing a second embodiment of the method which is controlled initially by data from the ambient light sensor 28 but switches to display location data if a failure is observed in the ambient light sensor 28. In this embodiment, the system regularly checks to determine if the ambient light sensor 28 is working properly. This can be checked in a number of ways, including a quick reference to the time of day and the ambient light sensor readings. Thus, if it is 3:00 a.m. in Lincoln, Nebr., we should see very low light levels and a very high light level reading would indicate some error or failure in the ambient light sensor 28. Alternatively, if it is 3:00 p.m. in Lincoln, Nebr. and there is a very low light reading, this could also indicate some error or failure in the ambient light sensor 28. Other signal analysis steps could also be performed where no signal whatsoever would indicate an error or failure or a very high voltage reading could also indicate an error or failure. Failures in the ambient light sensor 28 can also be determined by signal analysis methods which look at the amount of noise and randomness in the sensor data. A measured amount of noise or randomness that is above some threshold level can also be used to indicate a failure in the sensor.

If the ambient light sensor 28 is working properly, it is preferably used to determine the amount of luminance contacting the front display panel 25. Based on this information, the system may determine the desired backlight level based on this data. This step can also be performed in a number of ways. First, a lookup table may be used where a particular reading from the ambient light sensor 28 will correspond with a desired luminance reading from the light sensor 29 in the backlight cavity or light sensor 40 in front of the display 24. Second, an equation or ratio can be used where the desired luminance from the light sensor 29 or light sensor 40 may be calculated based on the data from the ambient light sensor 28. Third, the more simplistic daytime/nighttime settings can be used when the sensor 28 indicates daytime/nighttime and when the sensor 28 indicates a transition period (i.e. dawn/dusk) the display may default to the daytime setting.

If at any point during this operation the system determines that the ambient light sensor 28 is not working properly, the system preferably shifts to the display location data method described above.

Figure 4:
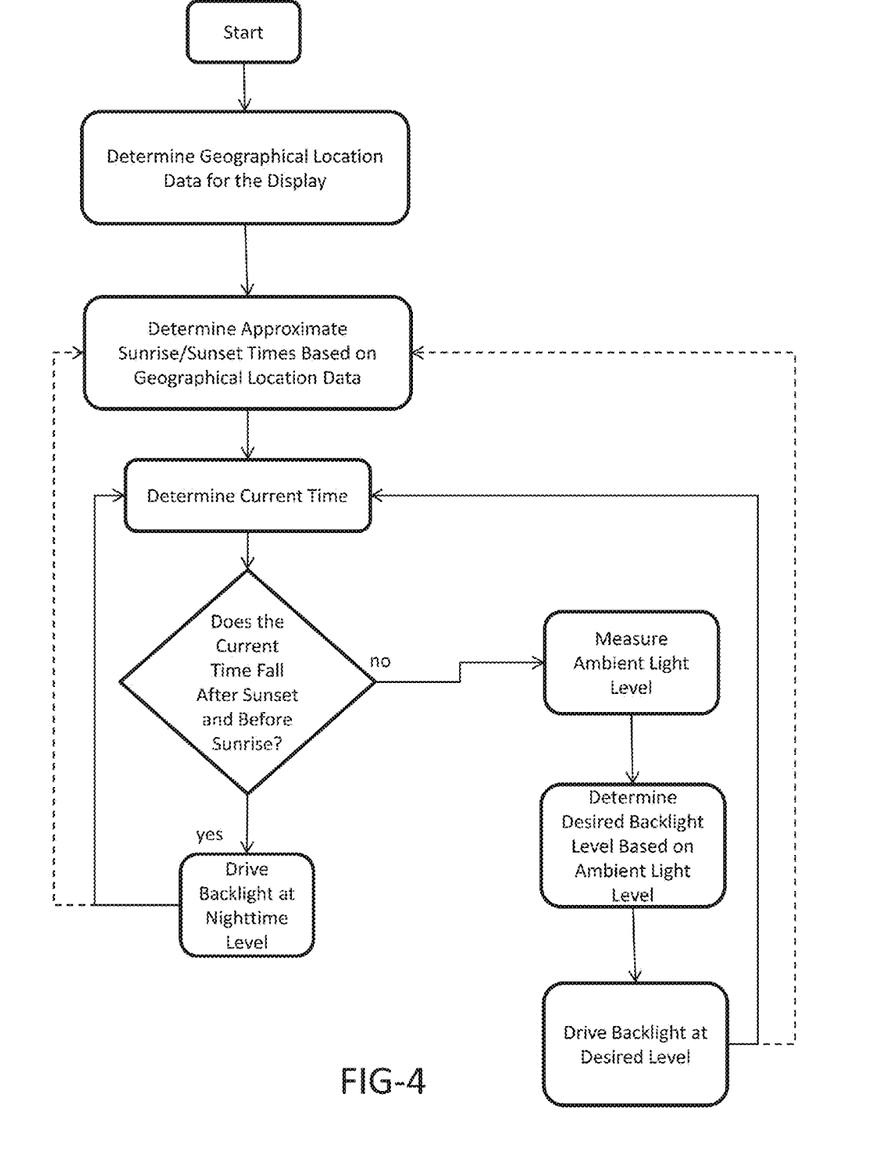
FIG. 4 provides a logical flow chart for performing a third embodiment of the method which is controlled based on the display location data in the nighttime but switches to control based on the ambient light sensor in the daytime.

FIG. 4 provides a logical flow chart for performing a third embodiment of the method which is controlled based on the display location data in the nighttime but switches to control based on the ambient light sensor 28 in the daytime. This is a type of hybrid approach where the backlight is driven at a desired (preferably constant) nighttime level anytime the display is between sunset and sunrise while adjusting to the various levels of ambient light when operating during the daytime or other transition periods (i.e. dawn/dusk).

Figure 5:
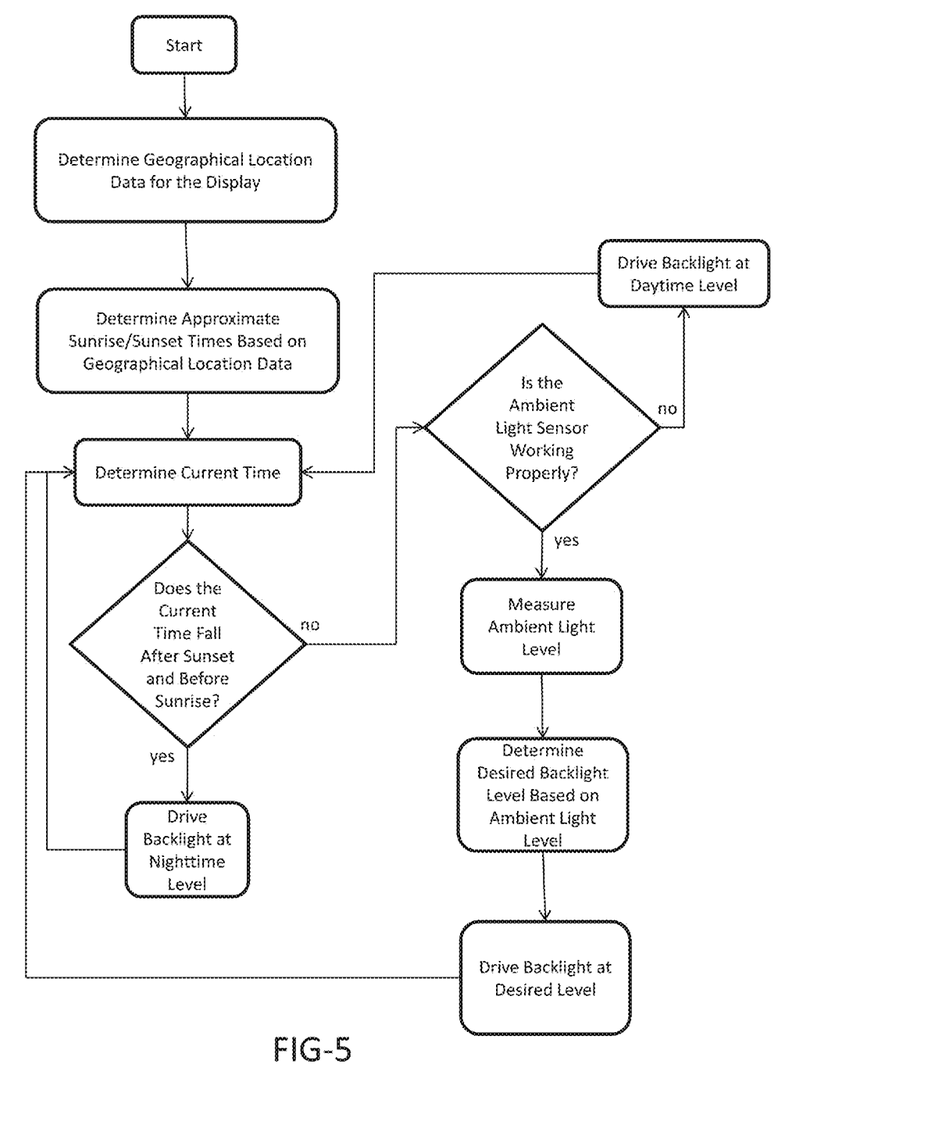
FIG. 5 provides a logical flow chart for performing a fourth embodiment of the method which is controlled based on the display location data in the nighttime but switches to control based on the ambient light sensor in the daytime unless a failure is detected in the ambient light sensor, at which point the system is controlled only by the display location data.

FIG. 5 provides a logical flow chart for performing a fourth embodiment of the method which is controlled based on the display location data in the nighttime but switches to control based on the ambient light sensor 28 in the daytime unless a failure is detected in the ambient light sensor 28, at which point the system is controlled only by the display location data. This embodiment is similar to the embodiment shown and described for FIG. 4 above, with the additional check to see if the ambient light sensor 28 is functioning properly. If not, then the backlight may be driven to a desired daytime level (preferably constant) based on the time of day, and will not consider the readings of the ambient light sensor.

It should be noted that when driving the backlight based on the location data and/or time of day, the system does not have to choose one luminance for daytime and one luminance for nighttime (although some embodiments use this method). The system can also use the time of day to slightly adjust the amount of luminance from the backlight. Thus, while 7:15 a.m. and 1:30 p.m. are each occurring after sunrise and before sunset, the system does not have to drive the backlight at the same luminance for each time. Thus, as used herein, the terms "nighttime level" and "daytime level" can represent luminance values that are also obtained through a lookup table (based on time of day) or an equation/calculation (based on time of day). In this manner, the system could drive the daytime level at 1:30 p.m. higher than the daytime level at 7:15 a.m. given the assumption that there will be more ambient light present during the afternoon than in the early morning (or late evening for that matter).

Figure 6:
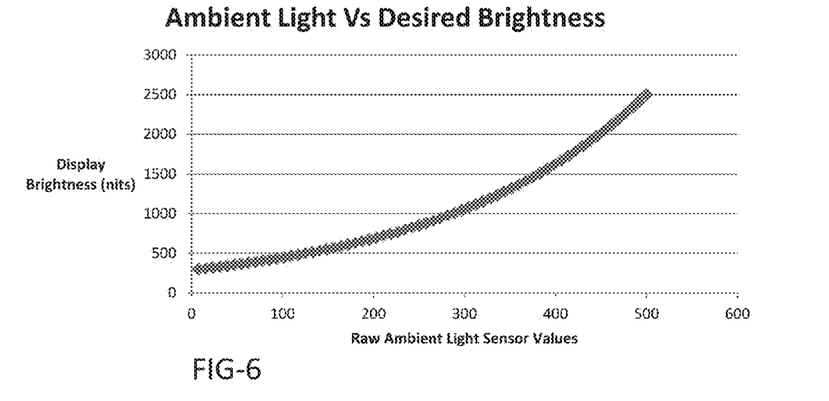
FIG. 6 provides a graphical representation of a desired display brightness in response to raw ambient light sensor data.
Figure 7:
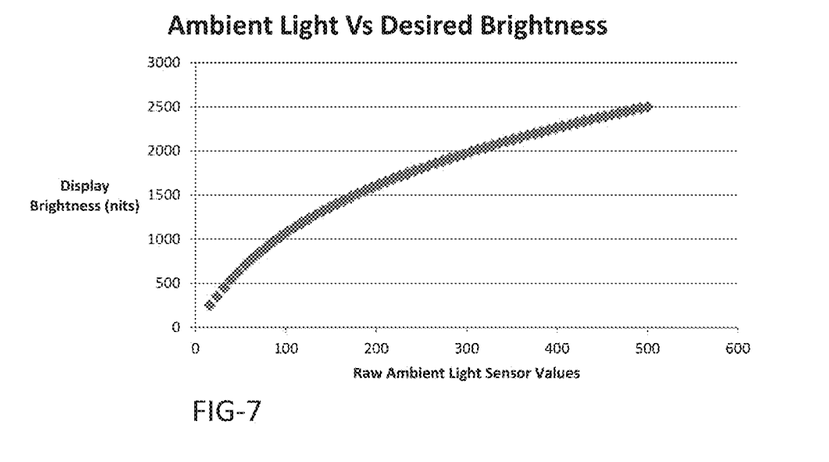
FIG. 7 provides a graphical representation of a desired display brightness in response to raw ambient light sensor data for this type of curve where the low ambient environments require a display set to a higher luminance level.

FIG. 6 provides a graphical representation of a desired display brightness in response to raw ambient light sensor data. This is an example, and not required for any specific embodiment. It has been found, that the human eye is more sensitive to luminance variations in low ambient light environments as compared to high ambient light environments. Therefore, some embodiments of the invention may use a more aggressive response curve at the lower ambient light environments. FIG. 7 provides a graphical representation of a desired display brightness in response to raw ambient light sensor data for this type of curve where the low ambient environments require a display set to a higher luminance level. Either curve (FIG. 6 or FIG. 7), or another curve, could be used to create the look-up table or perform an equation to determine the desired display brightness for each ambient environment.

It should be noted that while FIGS. 6 and 7 are shown in terms of display brightness, the exemplary embodiments herein can be based on either display brightness or backlight brightness, depending on which type(s) of electronic display is being used and the sensors used to measure the luminance output (if used). It should also be noted that the values for FIGS. 6 and 7 are based on actual raw data from ambient light sensors, but actual data is not necessarily used when using some of the exemplary embodiments herein. Thus, the calculation of artificial ambient sensor (AAS) values is described below, and these AAS values can be used with the relationships shown in FIGS. 6 and 7 to determine the desired display brightness. In other words, using the relationship shown in FIGS. 6 and 7 does not require the use of actual ambient light sensor data, as it can be used when working with AAS data as well. While based on the performance of real ambient sensors with real data, it is not required that actual raw data from ambient light sensors is used for any of the embodiments herein.

It should also be noted that changes from "nighttime level" backlight luminance to "daytime level" backlight luminance should not happen in a drastic manner, where an abrupt change or flicker in the display could be observed by a viewer. It is preferable that the changes in backlight luminance occur in a ramp-wise fashion, where the backlight does not suddenly shift to a new luminance, but instead gradually changes to a new luminance over a (shorter or longer) period of time that would make it less noticeable to a viewer.

It has been discovered, that anomalies in the display environment can sometimes create variations in the ambient light sensor data that can cause the display to change brightness levels drastically, even though the surrounding environment has not changed quite as drastically. For example, the ambient light sensor may be positioned within a shadow while the rest of the display is not. This select-shadowing can be caused by a number of obstructions, including but not limited to light posts, trees, passing vehicles, and/or construction equipment. Other anomalies can create variability in the ambient light sensor data, including variations in: the response of each different sensor, the response of the sensor over temperature changes, variations in the positioning of the light sensor in each display, and variations in the typical ambient environment of the display over time.

In some embodiments, as mentioned above, the system can function without the use of data from the ambient light sensor. This however does typically limit some of the functionality of the system and its benefits, specifically power saving benefits, and can sometimes produce drastic changes in the display luminance. However, the following embodiments provide a system and method for controlling the luminance of an electronic display by producing artificial ambient light sensor data (AAS).

In one embodiment, generating artificial ambient sensor data involves defining the following parameters:

(1) Desired Nighttime Level—the desired display brightness at nighttime.

(2) Desired Daytime Level—the desired display brightness during the daytime.

(3) High Ambient Reading (HA)—the approximate raw data received by the ambient light sensor when experiencing the highest ambient light levels for the display environment.

(4) GPS coordinates for the display location or the address/City/State.

(5) Sunrise transition period ($t^{sr}$)—the amount of time (usually measured in seconds) to transition from a nighttime ambient light sensor reading to a daytime ambient light sensor reading.

(6) Sunset transition period ($t^{ss}$)—the amount of time (usually measured in seconds) to transition from a daytime ambient light sensor reading to a nighttime ambient light sensor reading.

For this embodiment, during the sunrise transition period, the artificial ambient sensor (AAS) data can be calculated in the following manner, where $t^i$ provides the time in transition (i.e. $t^i$ varies between zero and $t^{sr}$).

$$AAS \text{ for sunrise} = (t^i * HA)/t^{sr}.$$

Similarly, the AAS for sunset can be calculated in the following manner, where $t^i$ provides the time in transition (i.e. $t^i$ varies between zero and $t^{ss}$).

$$AAS \text{ for sunset} = HA - (t^i * HA)/t^{ss}.$$

Once AAS for either transition period has been calculated, the desired backlight level can be determined from any of the ambient light vs. display brightness relationships described above.

Figure 8:
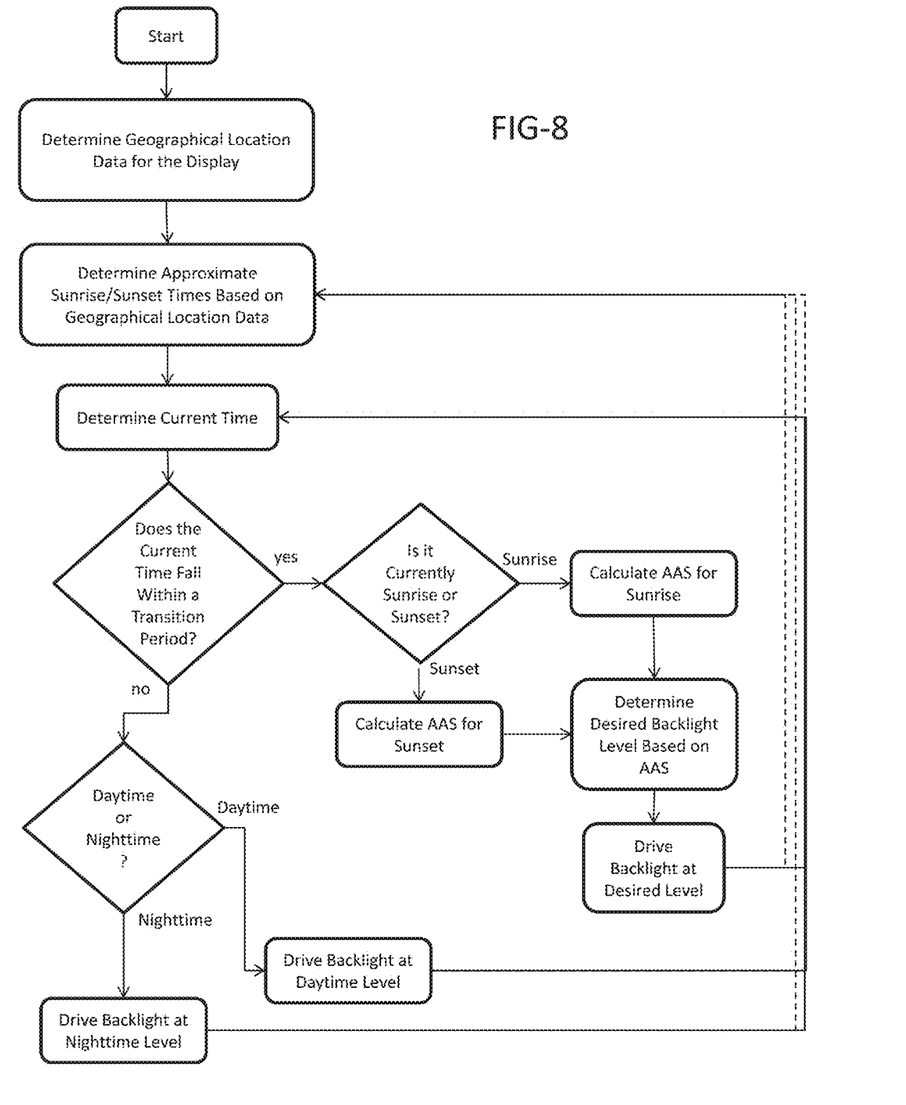
FIG. 8 provides a logical flowchart for performing an embodiment that uses the AAS technique during sunset/sunrise transition times while using a nighttime/daytime level for the remaining times.

FIG. 8 provides a logical flowchart for performing an embodiment that uses the AAS technique during sunset/sunrise transition times while using a nighttime/daytime level for the remaining times.

Figure 9:
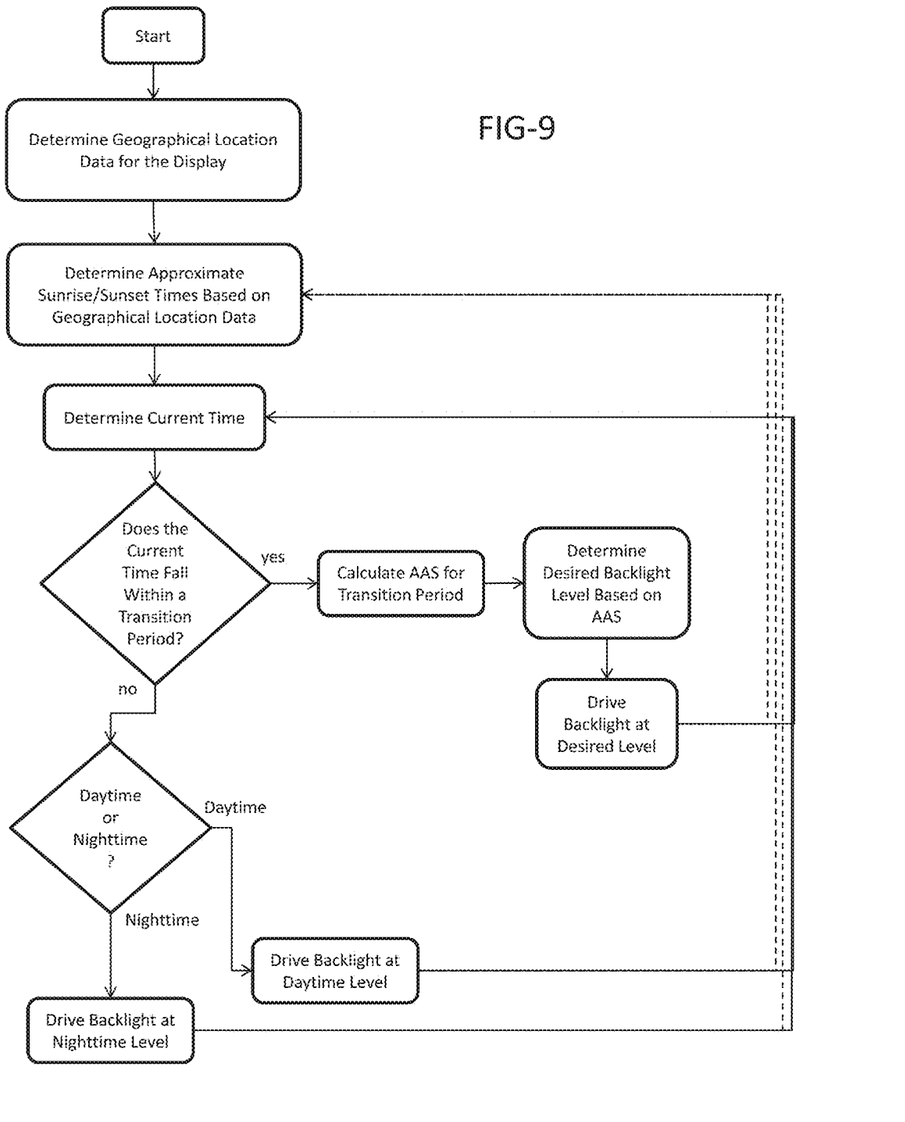
FIG. 9 provides a logical flowchart for performing an embodiment that uses the AAS technique with only a single transition period while using a nighttime/daytime level for the remaining times.

In some embodiments, the sunset transition period and the sunrise transition period may be similar or substantially the same. In this case, it may not be necessary to have two transition periods. Instead, one transition period may be used. FIG. 9 provides a logical flowchart for performing an embodiment that uses the AAS technique with only a single transition period while using a nighttime/daytime level for the remaining times.

In an advanced embodiment, the system and method can also utilize local weather information to further tailor the display brightness, without requiring actual data from the ambient light sensor. The local weather information can be obtained from available web APIs or other online weather information which may be accessed at a predetermined time interval (ex. every 15 minutes). Here, a weather factor (WF) is used where:

If it is daytime or any transition period: $WF=4*C^i$, where $C^i$=Clearness percentage with a higher percentage representing a clear sky and a lower percentage representing a large amount of cloud cover. Of course the inversion could be used, where a higher percentage represents more cloud cover and a lower percentage represents less cloud cover. Either technique can be used by a person of ordinary skill in the art.

For this embodiment, during the sunrise transition period, the artificial ambient sensor (AAS) data can be calculated in the following manner.

$$AAS \text{ for sunrise} = (t^i * (HA * WF))/t^{sr}.$$

Similarly, the AAS for sunset can be calculated in the following manner.

$$AAS \text{ for sunset} = (HA * WF) - (t^i * (HA * WF))/t^{ss}.$$

If it is daytime, $AAS = HA * WF$.

If it is nighttime, $AAS = 0$.

Once AAS for either transition period or the daytime has been calculated, the desired backlight level can be determined from any of the ambient light vs. display brightness relationships described above.

Figure 10:
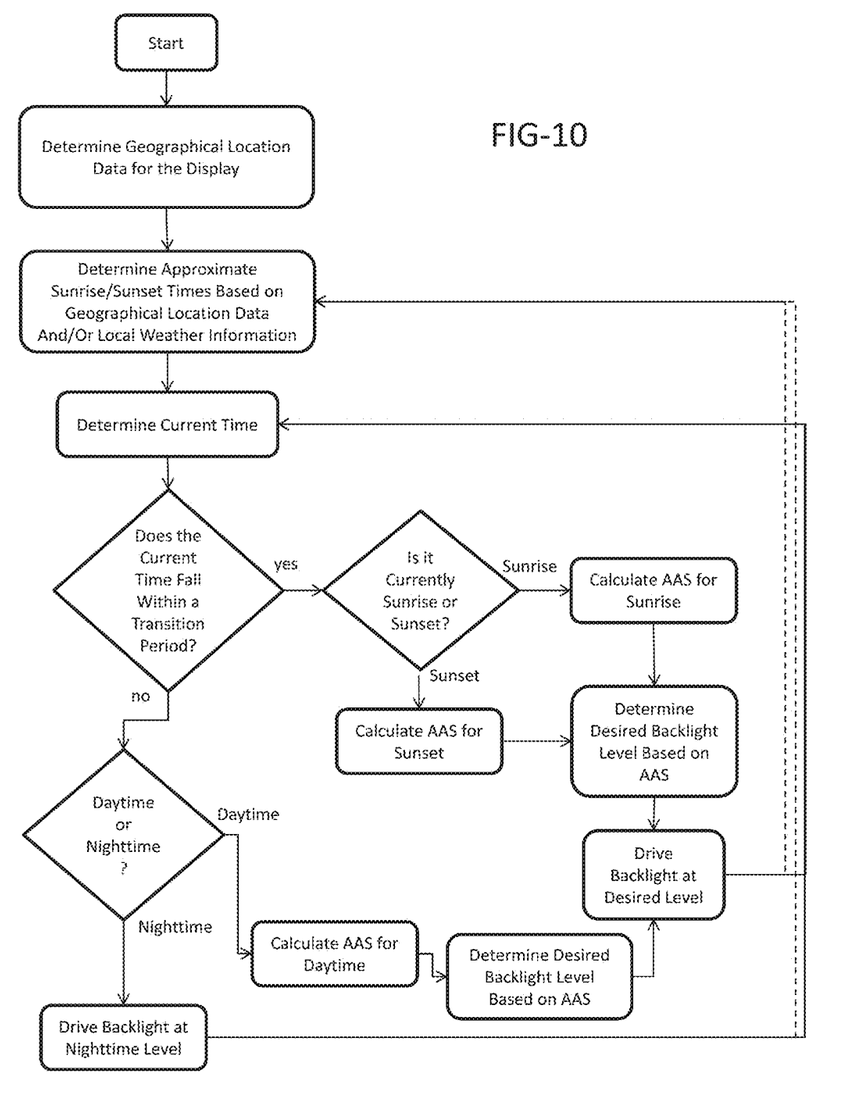
FIG. 10 provides a logical flowchart for performing the advanced embodiment that uses the AAS technique during sunset/sunrise transition times as well as the daytime while factoring in the local weather information.

FIG. 10 provides a logical flowchart for performing the advanced embodiment that uses the AAS technique during sunset/sunrise transition times as well as the daytime while factoring in the local weather information.

For example, when during the daytime (i.e. not within either transition period or nighttime) and where it is overcast and raining, the relevant calculations would be:

$Ci=10\%$ clearness percentage $HA=500$

Weather factor=$4*0.10=0.40$ $AAS=500*0.40=300$

Referencing FIG. 6 with ambient sensor input of 300, Desired Display Luminance~=1040 nits.

Referencing FIG. 7 with ambient sensor input of 300, Desired Display Luminance~=1965 nits.

Note that without correction for local weather conditions, the daytime value would likely be 500, which would mean the Desired Display Luminance=2500 nits. From here we see significant power savings due to the overcast skies.

For the same example, if the display is halfway through a sunrise or sunset transition, the calculated light sensor value and corresponding desired brightness would be:

$t^{sr}=1800$ seconds $t^i=900$ seconds $HA=500$

Weather factor=$4*0.10=0.40$ $AAS=(900*500*0.40)/1800=100$

Referencing FIG. 6 with ambient light sensor input of 100, Desired Display Luminance~=465 nits*

Referencing FIG. 7 with ambient sensor input of 100 Desired Display Luminance~=1030 nits.

Without correction for local conditions, the AAS value would be 250 which corresponds with a Desired Display Luminance~=850 nits.

Having shown and described preferred embodiments, those skilled in the art will realize that many variations and modifications may be made to affect the described embodiments and still be within the scope of the claims. Thus, many of the elements indicated above may be altered or replaced by different elements which will provide the same result and fall within the spirit of the claimed embodiments. It is the intention, therefore, to limit the invention only as indicated by the scope of the claims.

What is claimed is:

1. An electronic display assembly comprising:
   a liquid crystal display;
   a backlight placed behind the liquid crystal display;
   one or more power modules in electrical connection with the backlight; and
   a microprocessor in electrical connection with the power module(s) and adapted to:
      determine a geographical location for the liquid crystal display;
      determine sunrise and sunset times for a day based on the geographical location;
      determine a present time;
      direct the power module(s) to drive the backlight at a daytime level if the present time is between sunrise and sunset; and
      direct the power module(s) to drive the backlight at a nighttime level that is less than the daytime level if the present time is between sunset and sunrise;
      wherein the microprocessor is adapted to maintain the backlight in an on state throughout an entire course of a day.

2. The electronic display assembly of claim 1 further comprising:
   an ambient light sensor placed in electrical connection with the microprocessor.

3. The electronic display assembly of claim 2 wherein:
   the microprocessor is further adapted to direct the power module(s) to drive the backlight based on data from the ambient light sensor.

4. The electronic display assembly of claim 3 wherein:
   the microprocessor is further adapted to determine a possible failure in the ambient light sensor.

5. The electronic display assembly of claim 4 wherein the microprocessor is adapted to direct the power module(s) to drive the backlight based on data from the ambient light sensor if the present time is between sunrise and sunset, unless the microprocessor has determined a possible failure in the ambient light sensor.

6. The electronic display assembly of claim 3 wherein the microprocessor is adapted to direct the power module(s) to drive the backlight based on data from the ambient light sensor if the present time is between sunrise and sunset.

7. The electronic display assembly of claim 2 wherein:
   the microprocessor is further adapted to determine a possible failure in the ambient light sensor and direct the power module(s) to drive the backlight at a nighttime or daytime level when a failure in the ambient light sensor is detected, and direct the power module(s) to drive the backlight based on data from the ambient light sensor when no failure is detected.

8. The electronic display assembly of claim 1 wherein:
   the microprocessor is further adapted to:
      determine whether the present time is during a sunset or sunrise transition period;
      calculate artificial ambient sensor data (AAS) for sunset, if during a sunset transition period;
      calculate artificial ambient sensor data (AAS) for sunrise, if during a sunrise transition period; and
      direct the power module(s) to drive the backlight based on the AAS data if during the sunset transition period or the sunrise transition period;
      wherein the AAS data, depending on time of day, takes into account: data that approximates ambient light level for a display environment; the sunrise transition period; and the sunset transition period.

9. The electronic display assembly of claim 8 wherein:
   the AAS data, depending on time of day, further takes into account a desired display brightness level during daytime; and
   the microprocessor is further adapted to direct the power module(s) to drive the backlight based on the AAS data if the present time is between the sunrise transition period and the sunset transition period.

10. The electronic display assembly of claim 1 wherein:
    the microprocessor is further adapted to:
       determine whether the present time is during a sunset or sunrise transition period;
       calculate artificial ambient sensor data (AAS) if during a sunset or sunrise transition period; and
       direct the power module(s) to drive the backlight based on the AAS data if during the sunset transition period or the sunrise transition period;
       wherein the AAS data, depending on time of day, takes into account: data that approximates ambient light level for a display environment; the sunrise transition period; and the sunset transition period.

11. The electronic display assembly of claim 10 wherein:
    the AAS data, depending on time of day, further takes into account a desired display brightness level during daytime; and
    the microprocessor is further adapted to direct the power module(s) to drive the backlight based on the AAS data if the present time is between the sunrise transition period and the sunset transition period.

12. The electronic display assembly of claim 1 wherein:
    the microprocessor is further adapted to:
       determine local weather information;
       calculate artificial ambient sensor data (AAS) based on the local weather information; and
       direct the power module(s) to drive the backlight based on the AAS data;
       wherein the AAS data, depending on time of day, further takes into account: a desired display brightness level at nighttime; a desired display brightness level during daytime; data that approximates ambient light level for a display environment; the sunrise transition period; and the sunset transition period.

13. The electronic display assembly of claim 1 wherein the microprocessor is adapted to vary power to the backlight to adjust brightness of the liquid crystal display in response to a change in actual or estimated ambient light level.

14. The electronic display assembly of claim 13 wherein the microprocessor is adapted to vary power to the backlight to adjust brightness of the liquid crystal display in a non-linear fashion in response to changes in actual or estimated ambient light level.

15. The electronic display assembly of claim 1 wherein the microprocessor does not use data from an ambient light sensor to drive the backlight.

16. The electronic display assembly of claim 1 further comprising a backlight sensor positioned within a cavity for the backlight and configured to measure luminance generated by the backlight within the cavity;
wherein the backlight sensor is in communication with the microprocessor to provide feedback regarding backlight luminance to assist with control of power to the backlight.

17. The electronic display assembly of claim 1 further comprising a display luminance sensor configured to measure luminance generated by the liquid crystal display;
wherein the display luminance sensor is in communication with the microprocessor to provide feedback regarding display luminance to assist with control of power to the backlight.

18. The electronic display assembly of claim 1 further comprising at least one data interface adapted to permit a remote user to communicate with the electronic display assembly.

19. The electronic display assembly of claim 18 wherein the at least one data interface enables a remote user to adjust at least one of the following settings: on/off, brightness level, enabling ambient light sensor, various alert settings, IP address, customer defined text/video, display matrix settings, display of image settings via OSD, and software functions.

20. The electronic display assembly of claim 1 further comprising at least one data interface adapted to transmit at least one of the following types of information: power supply status, power supply test results, AC input current, temperature sensors, fan speed, video input status, firmware revision, and light level sensors.

21. An electronic display assembly comprising:
a liquid crystal display;
a backlight placed behind the liquid crystal display;
one or more power modules in electrical connection with the backlight; and
a microprocessor in electrical connection with the power module(s) and adapted to:
determine a geographical location for the liquid crystal display;
determine sunset and sunrise times for a day based on the geographical location of the liquid crystal display, including a sunset transition period and a sunrise transition period;
determine a present time;
determine if the present time is during the sunrise transition, daytime, the sunset transition, or nighttime;
calculate artificial ambient sensor data (AAS) for sunrise and direct the power module(s) to drive the backlight based on the AAS data if the present time is during the sunrise transition period;
direct the power module(s) to drive the backlight at a daytime level if the present time is daytime;
calculate artificial ambient sensor data (AAS) for sunset and direct the power module(s) to drive the backlight based on the AAS data if the present time is during the sunset transition period; and
direct the power module(s) to drive the backlight at a nighttime level that is less than the daytime level if the present time is nighttime;
wherein the microprocessor is adapted to maintain the backlight in an on state throughout an entire course of a day.

22. The electronic display assembly of claim 21 wherein:
the microprocessor is adapted to direct the power module(s) to drive the backlight based on the AAS data by calculating a desired display luminance based on ambient light sensor readings.

23. The electronic display assembly of claim 21 wherein:
the microprocessor is adapted to direct the power module(s) to drive the backlight based on the AAS data by using a table of desired display luminance values based on ambient light sensor readings.

24. The electronic display assembly of claim 21 wherein:
the microprocessor is adapted to direct the power module(s) to drive the backlight based on the AAS data by calculating a desired backlight luminance based on ambient light sensor readings.

25. The electronic display assembly of claim 21 wherein:
the microprocessor is adapted to direct the power module(s) to drive the backlight based on the AAS data by using a table of desired backlight luminance values based on ambient light sensor readings.

26. The electronic display assembly of claim 21 wherein:
the microprocessor is further adapted to determine local weather information;
wherein the AAS data is calculated based on the local weather information.

27. The electronic display assembly of claim 26 wherein:
the local weather information is determined by calculating a percentage of cloud cover.

28. An electronic display assembly comprising:
a liquid crystal display;
a backlight placed behind the liquid crystal display;
one or more power modules in electrical connection with the backlight;
a GPS device; and
a microprocessor in electrical connection with the power module(s) and the GPS device and adapted to:
determine location data for the liquid crystal display through the GPS device;
determine sunrise and sunset times for a day based on the location data;
determine a present time;
evaluate the present time in relation to the sunrise and sunset times; and
direct the power module(s) to drive the backlight based on the evaluation of the present time;
wherein the microprocessor is adapted to gradually ramp a brightness of the liquid crystal display during a transition between daytime and nighttime;
wherein the microprocessor is adapted to maintain the backlight in an on state throughout an entire course of a day.

29. The electronic display assembly of claim 28 wherein:
the microprocessor does not use data from an ambient light sensor to drive the backlight.

30. The electronic display assembly of claim 28 wherein:
the microprocessor is adapted to determine the sunrise and sunset times based on longitude and latitude coordinates of the electronic display.

31. The electronic display assembly of claim 28 wherein:
the microprocessor is adapted to determine the sunrise and sunset times by calculating a sunrise equation.

* * * * *